Aug. 15, 1967 K. CECH 3,336,430
PROCESS OF FORMING PLANAR OR CYLINDRICAL FIT
SURFACES ON PARTS OF PLASTIC MATERIALS
Filed Nov. 27, 1963

INVENTOR.
KARL CECH
BY
ATTORNEY

United States Patent Office 3,336,430
Patented Aug. 15, 1967

3,336,430
PROCESS OF FORMING PLANAR OR CYLINDRICAL FIT SURFACES ON PARTS OF PLASTIC MATERIALS
Karl Cech, Vienna-Modling, Austria, assignor to Akustische U. Kino-Gerate Gesellschaft m.b.H., Vienna, Austria, a corporation of Austria
Filed Nov. 27, 1963, Ser. No. 326,459
Claims priority, application Austria, Dec. 18, 1962, A 9,869/62
16 Claims. (Cl. 264—296)

In the manufacture of articles from plastic materials, it is frequently required to form one surface or the other according to an exact dimension, for instance, because an assembly with other parts, particularly with metal parts, in mass production is required.

An exact adhering to all dimensions, however, is inherently impossible in parts made from plastic materials because the material does not uniformly contact when cooling, so that deviations from the desired dimension occur and the tolerances permissible for fit surfaces are exceeded. These tolerances are often only in an order of hundredths of a millimeter.

This has previously been corrected by a subsequent machining of the surfaces intended to serve as fit surfaces, for instance, by grinding or the like. It is not easy to apply these processes to parts of plastic materials because an excessively high working speed will result in an inadmissible temperature rise of the plastic material so that the entire work may become useless. Particularly when the bodies are of complex shape, it is very difficult to hold them in a manner which is suitable for such subsequent machining.

The invention eliminates all these disadvantages and permits the formation of fit surfaces in parts made from plastics materials with the required accuracy with simple means.

The process according to the invention is characterized in that those surfaces which are to be formed as fit surfaces are provided with a fine relief in the form of a grating, or grooves, or a graticule during the manufacture of the member of plastic material in any known process, such as injection-molding, pressing etc., and that the member is cooled and, if desired, subjected ot ageing and the relief is then compressed with a hot punch until the desired dimension for the fit surface has been exactly achieved.

The process according to the invention will be explained more in detail with reference to the accompanying drawing.

Figure 1:
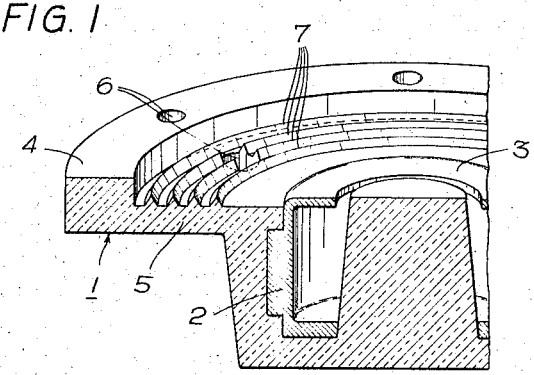
FIG. 1 shows partly in section a member which is made from plastics material and to which the invention has been applied.

FIG. 1 is a perspective view showing partly in section a member made from thermoplastic material and intended for use as a body for a dynamic microphone. This member has the reference numeral 1. The metal member 2 is embedded by casting or pressing in this body 1 and at its top is flush with the surface 3. The body 1 has a flange-like portion 4, which serves as a backing for the rim of the diaphragm. The inner annular portion 5 of the flange 4 is formed with grooves 7 and will subsequently form a fit surface, which should lie, e.g., in the same plane as the top surface 3 of the metal member 2. The grooves 7 may be replaced by a different pattern, for instance, a graticule. The depth of the relief must in any case be such that the deviations occurring during the shaping of the part of plastic material will be reliably smaller than the depth of the relief.

Figure 2:
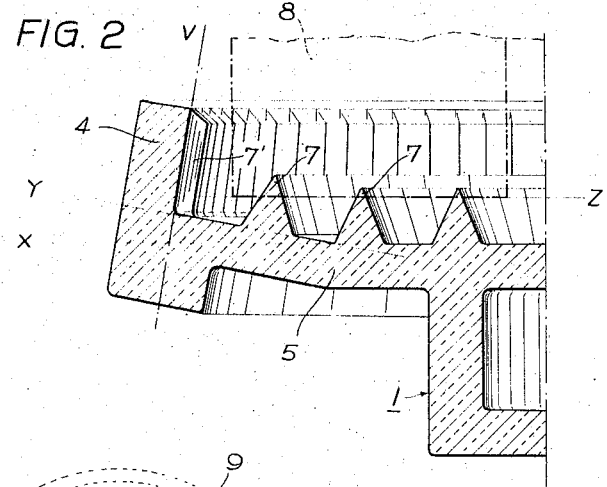
FIG. 2 is an enlarged fragmentary view of a portion of the member made from plastics material.

FIG. 2 is an enlarged sectional view showing that portion of the body made from plastic material which is provided with the relief according to the invention. The flange-like portion 5 of the body is terminated on the outside by the annular portion 4. At the transition, in the zone where the disclike flange portion 5 meets the annular portion 4, there will be in most cases an increase in thickness resulting in a change from plane X to plane Y at this point so that plane X will not be at right angles to the cylindrical surface W and an exact fitting, e.g., of a disc or a diaphragm having a rim holder would not be possible. On the other hand, if the body made from plastic material has been formed according to the invention with a relief, for instance, in the form of the grooves shown in FIG. 2, an exact fit surface lying in the desired plane Z can be obtained simply by pressure-flattening the apices of the relief. Pressure-flattening may usually be effected with a hot punch 8, which may be, for instance, electrically heated.

It may be suitable to form the inside surface V of the annular part 4 as a fit surface. In this case this surface is formed with axial ribs 7'. The associated punch for reducing the ribs 7' to the desired size must either be cylindrical and have the exact dimension—in this case the punch may be centered in an opening of the metal part 3 etc.—or a device must be provided which comprises a smaller punch, which enables the smoothening to the desired dimension by rolling.

Figure 3:
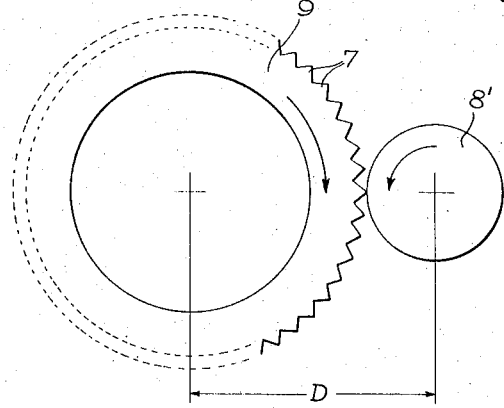
FIG. 3 shows the application of the process according to the invention to members having cylindrical fit surfaces and made from plastics material.

FIG. 3 shows diagrammatically the application of the process according to the invention to a cylindrical body. The latter may be tubular and may be required to have an exactly predetermined outside diameter. According to the invention, such a pressed or injection-molded tubular part 9 is formed on its outside surface with a relief consisting of small grooves or the like. These grooves need not be parallel to the axis of the tube but may form concentric or may be inclined. The relief need not consist of grooves but may have conical or pyramidal elevations. It will be easy for a person skilled in the art to select those forms which are most desirable for a given purpose. For shaping the tubular body 9 to size, it is fixed in a device having a heated roll 8'. Because the diameter of the flattening roll is exactly known, the distance D from the axis of the body 9 may be exactly determined. The flattening roll is rolled on the profile 7 until the latter has been compressed to the desired size.

What is claimed is:

1. A process of shaping thermoplastic material to form a member having a fit surface exactly coordinated to a fixed reference point, which process comprises the steps of shaping thermoplastic material into a member having a predetermined geometrical shape and formed with a fine relief on a surface intended to constitute such fit surface, allowing said member to cool, and, while the member remains cool, providing a fixed reference point on the formed member adjacent the fine relief surface and compressing said relief with a hot punch until the member has, at the apices of said relief, the desired coordination of said fit surface to the fixed reference point.

2. A process as set forth in claim 1, in which said member formed with a relief is produced by injection-molding.

3. A process as set forth in claim 1, in which said member formed with a relief is produced by pressing.

4. A process as set forth in claim 1, in which said member is formed with a relief in the form of a grating.

5. A process as set forth in claim 1, in which said member is formed with a relief in the form of grooves.

6. A process as set forth in claim 1, in which said member is formed with a relief in the form of a graticule.

7. A process as set forth in claim 1, in which said member is subjected to ageing after it has been cooled and before said relief is compressed.

8. A process as set forth in claim 1, in which said member is formed with a relief having a height which is a fraction of the remaining wall thickness of the member below said relief.

9. A process as set forth in claim 1, in which said relief is formed on a generally planar surface.

10. A process as set forth in claim 1, in which said relief is formed on a generally cylindrical surface.

11. A process as set forth in claim 1, in which the height of said relief when originally formed exceeds the shrinkage of said member during cooling in a direction generally normal to said surface.

12. A process as set forth in claim 1, in which said member is subjected to ageing after it has been cooled and before said relief is compressed and the height of said relief when originally formed exceeds the shrinkage of said member during said cooling and ageing in a direction generally normal to said surface.

13. A process of shaping thermoplastic material to form a member having a fit surface, which process comprises the steps of shaping thermoplastic material into a member formed with a fine relief on a surface intended to constitute a fit surface, allowing said member to cool, and then compressing said relief with a hot punch until the member has, at the apices of said relief, the desired dimension for said fit surface, the height of said relief exceeding the shrinkage of said member during cooling in a direction generally normal to said surface and said relief being originally formed with depressions sufficient to take up the material displaced by compressing said relief.

14. A process of shaping thermoplastic material to form a member having a fit surface, which process comprises the steps of shaping thermoplastic material into a member formed with a fine relief on a surface intended to constitute a fit surface, allowing said member to cool, and then compressing said relief with a hot punch until the member has, at the apices of said relief, the desired dimension for said fit surface, said member being subjected to ageing after it has been cooled and before said relief is compressed, the height of said relief when originally formed exceeding the shrinkage of said member during said cooling and ageing in a direction generally normal to said surface, and said relief being originally formed with depressions sufficient to take up the material displaced by compressing said relief.

15. A process as set forth in claim 1, in which said punch is formed by a roller, which is forced against and rolled over said surface.

16. A process as set forth in claim 15, in which said member has an outside cylindrical surface formed with said relief and said member is rotated in contact with said roller.

References Cited

UNITED STATES PATENTS

| | | | |
|---|---|---|---|
| 2,463,894 | 3/1949 | Marini | 18—48 |
| 2,523,924 | 9/1950 | Sawyer | 18—47.5 |

ROBERT F. WHITE, *Primary Examiner.*

G. AUVILLE, *Assistant Examiner.*